United States Patent [19]

Yoshida et al.

[11] 4,229,793

[45] Oct. 21, 1980

[54] METHOD AND APPARATUS FOR CONTROLLING INTERNAL COMBUSTION ENGINES

[75] Inventors: Hiroshi Yoshida, Aichi; Nobuo Tabara, Chiryu; Keiji Aoki, Susono, all of Japan

[73] Assignees: Nippondenso Co., Ltd., Kariya; Toyota Jidosha Kogyo Kabushiki Kaisha, Toyota, both of Japan

[21] Appl. No.: 906,666

[22] Filed: May 16, 1978

[30] Foreign Application Priority Data

May 25, 1977 [JP] Japan .................................. 52-61446

[51] Int. Cl.[2] ........................ G05B 15/02; G06F 7/38; F02D 5/00

[52] U.S. Cl. .................................... 364/431; 123/486; 123/594; 364/300; 364/735

[58] Field of Search ............... 364/424, 425, 735, 300, 364/431, 442; 123/117 D, 32 EB

[56] References Cited

U.S. PATENT DOCUMENTS

| | | | |
|---|---|---|---|
| 3,906,207 | 9/1975 | Rivere | 123/32 EA |
| 3,969,614 | 7/1976 | Moyer et al. | 123/32 EA |
| 4,009,378 | 2/1977 | Sakamoto | 364/431 |
| 4,009,699 | 3/1977 | Hetzler et al. | 123/117 D |
| 4,099,495 | 7/1978 | Kiencke et al. | 364/424 |

OTHER PUBLICATIONS

Nikkei Electronics Books, pp. 202, 203, published May 20, 1976, All about the Micro-Computer Technology.

*Primary Examiner*—Felix D. Gruber

*Attorney, Agent, or Firm*—Cushman, Darby & Cushman

[57] ABSTRACT

A method and apparatus for controlling an internal combustion engine by a digital computer. A pulse generator for generating reference pulse signals in synchronism with the rotation of the crankshaft of the engine is associated with the digital computer which is programmed to discriminate the rotational speed of the engine is higher or lower than a predetermined value in response to the reference signals and digitally calculate a required amount of fuel to be supplied to the engine or the like. When the rotational speed is discriminated to be lower than the predetermined value, the required calculation, including first and second portions is completed in response to each reference pulse signal and the combustion of the engine is controlled according to the calculated value, whereas when the rotational speed is discriminated higher than the predetermined value, the first and second portions of the calculation are performed alternately in response to successive reference pulse signals, and with each reference pulse the results of the most recently executed first and second portions are combined to form a calculated value and the combustion of the engine is controlled in accordance with the calculated value.

4 Claims, 6 Drawing Figures

METHOD AND APPARATUS FOR CONTROLLING INTERNAL COMBUSTION ENGINES

BACKGROUND OF THE INVENTION

The present invention relates to a method and apparatus for controlling the combustion produced in an internal combustion engine in accordance with the rotational speed of the engine, and more particularly the invention relates to such method and apparatus well suited for digitally calculating the amount of fuel supply and the like related to the combustion of the engine.

Conventionally, methods and apparatuses are known in the art, such as, disclosed in the U.S. Pat. No. 3,969,614, in which the amount of fuel supply and the spark ignition timing related to the combustion in an internal combustion engine are controlled by a digital computer. In accordance with a known method of this type, the number of times that the amount of fuel supply is computed for every revolution of the engine (every crankshaft revolution) is fixed irrespective of the rotational speed (the number of revolution or rotational frequency) of the engine, and the number of calculations correspond to the number of times fuel is supplied in accordance with the results of the calculations. However, in consideration of the fact that the rotational speed of the engine changes from the lower range speed to the upper range speed which is ten times or one hundred times the lower range value, at high speeds the time allowed for calculations (the time period of one engine revolution) is decreased thus causing successive calculations to tend to become closer with each other. In particular, where not only the amount of fuel supply but also the spark ignition timing are calculated by the digital computer, the time required for making the necessary calculations is increased proportionately thus making it extremely difficult to complete all of the required calculations for every revolution of the engine at the high speed operation of the engine.

SUMMARY OF THE INVENTION

With a view to overcoming the foregoing deficiencies, it is an object of the present invention to a control method and apparatus so designed that the number of calculations per unit revolution of an engine is decreased as the rotational speed of the engine is increased.

To accomplish the above object, the present invention comprises successively generating reference pulse signals in synchronism with the rotation of the crankshaft of the engine, and discriminating whether the rotational speed of the engine is higher than a predetermined value, whereby when the result of the discrimination indicates that the rotational speed is lower than the predetermined value the required calculation is completed in response to each of the reference pulses and the combustion of the engine is controlled in accordance with the calculated value, whereas when the discrimination result indicates that the rotational speed is higher than the predetermined value the required calculation is completed in response to a plurality of reference pulse signals and the combustion of the engine is controlled in accordance with the calculated value.

Thus, by virtue of the fact that the invention comprises successively generating reference pulse signals in synchronism with the rotation of the crankshaft of an internal combustion engine, and detecting the rotational speed of the engine to discriminate whether the rotational speed is higher than a predetermined value, whereby when the result of the discrimination indicates that the rotational speed is lower than the predetermined value the necessary calculation for controlling the combustion of the engine is performed in response to each reference pulse signal and the engine is controlled in accordance with the calculated value, while on the other hand when the result of the discrimination indicates that the engine rotational speed is higher than the predetermined value the necessary calculation is performed for every plurality of reference pulse signals and the engine is controlled in accordance with the calculated value, the present invention has among its great advantages the fact that the number of calculations per unit rotation of the engine is decreased with increase in the rotational speed of the engine thus preventing the total amount of time required for the calculations from varying in proportion to variations in the engine rotational speed and controlling the engine with substantially the same response throughout a wide range of the engine rotational speeds to thereby ensure improved engine exhaust emission control and improved acceleration performance.

DESCRIPTION OF THE PREFERRED EMBODIMENT

The present invention will now be described in greater detail with reference to the illustrated embodiment.

Figure 1:
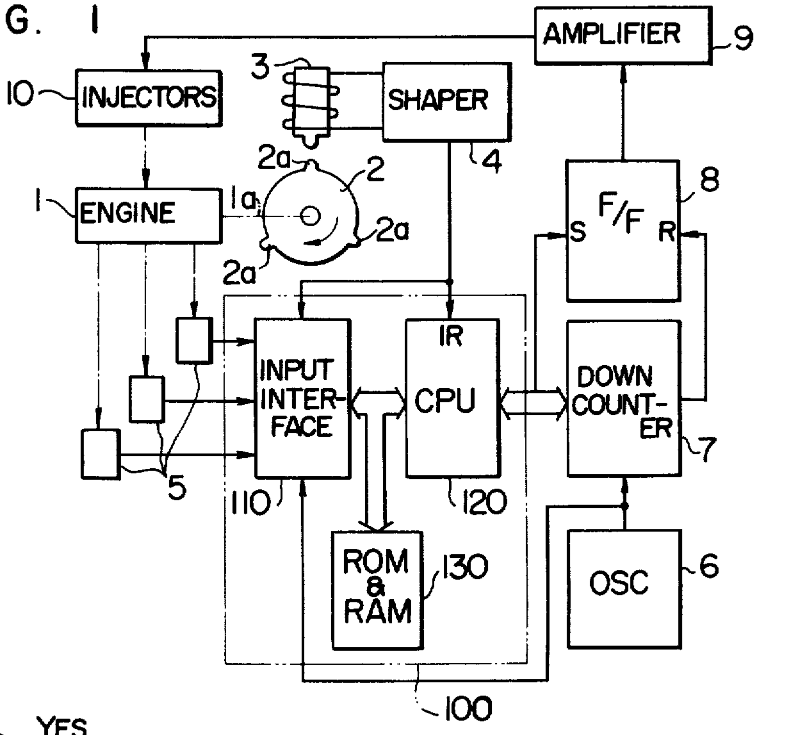
FIG. 1 is a block diagram showing the general construction of a fuel supply system for internal combustion engines incorporating the present invention.

Referring to FIG. 1, there is illustrated a block diagram showing the general construction of an embodiment of the present invention applied to the control of fuel supply to an internal combustion engine. In the Figure, numeral 1 designates a six-cylinder four-cycle engine in which a crankshaft 1*a* is rotated by the combustion of fuel-air mixture in the respective cylinders. Since the engine 1 is a four-cycle engine, the mixture is burned in each of the cylinders once for every two revolutions of the crankshaft 1*a*. Consequently, fuel supply as well as spark ignition must be effected at least once for every two revolutions of the crankshaft 1*a*. Numeral 2 designates a disk mounted on the crankshaft 1*a* of the engine 1 and provided with projections 2*a* arranged on its circumference at a spacing of 120°. Numeral 3 designates an electromagnetic pickup comprising a magnet and a coil wound on the magnet, so that a reference signal is generated when each of the projections 2*a* on the disk 2 moves past the pickup 3. Since the disk 2 includes three projections, six reference signals are generated for every two revolutions of the crankshaft 2. Numeral 4 designates a shaper for amplifying and reshaping the reference signals to generate as many reference pulse signals as there are reference signals generated from the electromagnetic pickup 3. Numeral 5 designates a group of sensors for detecting the necessary information for calculating the desired amount of fuel to be supplied to the engine 1, including a sensor for detecting the amount of air drawn in, a sensor for detecting the temperature of engine cooling water, etc. The electromagnetic pickup 3 and the shaper 4 function as a sensor for detecting the rotational speed of the engine 1. Numeral 6 designates an oscillator for generating clock pulses of a predetermined frequency, 7 a presettable down counter whereby after a digital value (a parallel binary coded signal) representing the amount of fuel supply calculated by a digital computer 100 which will be described later has been received and stored, the stored content is decreased in response to the clock pulses applied from the oscillator 6 and a borrow signal is generated when the stored content is reduced to zero. Numeral 8 designates an R-S flip-flop adapted to be set in response to the delivery of a calculated value from the digital computer 100 to the down counter 7 and to be reset in response to the generation of a borrow signal from the down counter 7. Numeral 9 designates an amplifier for amplifying the output of the flip-flop 8 which is generated while the flip-flop 8 is in the set state, and 10 electromagnetic injectors provided in the respective cylinders of the engine 1 and adapted to be opened by the amplifier 9, whereby when each of the injectors 10 is opened, fuel under a predetermined pressure is injected and supplied into the cylinder. In order to actuate the electromagnetic injectors 10 one by one according to the firing order of the engine 1, a distributor which is not shown is of course provided between the amplifier 9 and the injectors 10 to distribute the output of the amplifier 9 to the injectors 10. Where the electromagnetic injectors 10 are adapted to be actuated simultaneously, there is no need to provide a distributor and it is necessary for the disk 2 to include only one projection *2a*.

In the embodiment described above, the digital computer 100 comprises a known type of microcomputer (e.g., the Tokyo Shibaura Electric TLCS 12A or the Motorola Semiconductor Products Inc. M6800). The computer 100 of this type mainly comprises an input interface 110, a central processing unit 120 and a memory 130. The input interface 110 receives the analog or digital signals supplied simultaneously from the plurality of sensors 5 and the reference pulse supplied from the shaper 4 and convert them successively into parallel binary signals in response to the clock pulses from the oscillator 6. Thus, the digital values supplied from the input interface 110 to the CPU 120 or the RAM (random access memory) of the memory 130 corresponds to the detected values of the intake air flow, rotational frequency, cooling water temperature, etc., of the engine 1. The CPU 120 has an interrupt request terminal IR so that each time a reference pulse is applied from the shaper 4, a large number of instructions which are programmed beforehand are executed. The instructions are stored in the ROM (read only memory) of the memory 130. In response to the digital values generated from the input interface 110, the CPU 120 executes the previously mentioned instructions to thereby perform an operation of calculating the fuel requirement of the engine 1, so that when the calculation is completed, a digital value representative of the result of the calculation is supplied to the down counter 7 and also a signal is generated to set the flip-flop 8. The CPU 120 temporarily stores the computational data in the course of the calculation of the fuel quantity.

Figure 2:
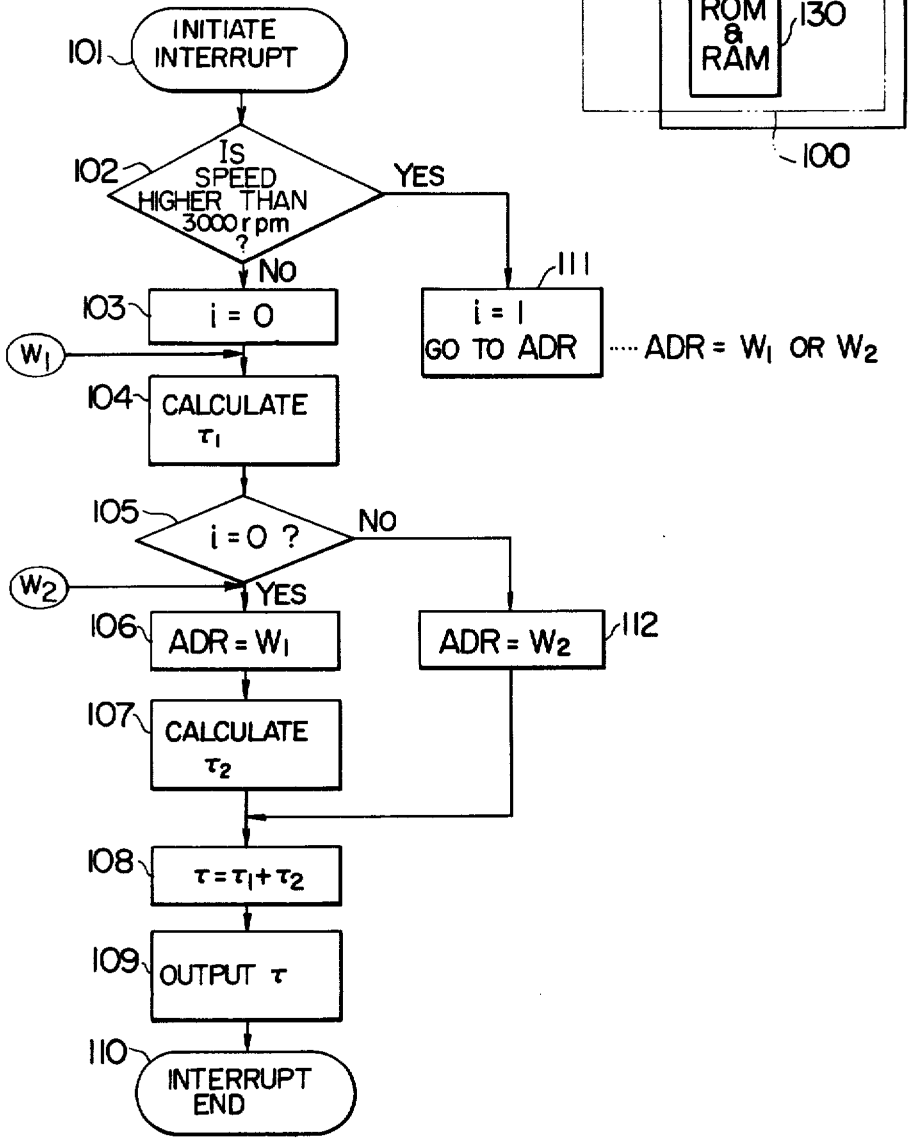
FIG. 2 is a flow chart showing the typical processing steps performed by the digital computer shown in FIG. 1.
Figure 3:
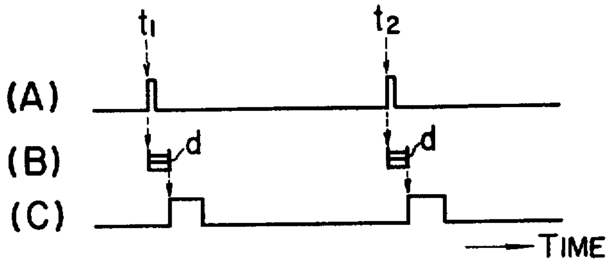
FIGS. 3 and 4 are diagrams useful for explaining the operation of the apparatus shown in FIG. 1 performing the processing steps shown in FIG. 2.
Figure 4:
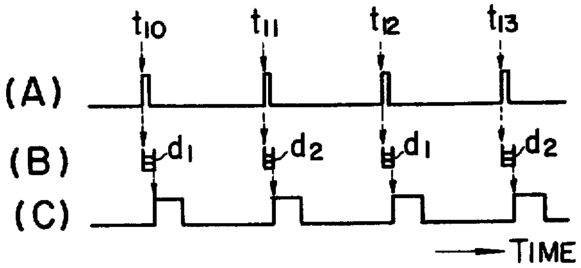

Next, the operation of the embodiment constructed as described above, particularly the operation of the digital computer 100 will be described with reference to FIGS. 2, 3 and 4. FIG. 2 is a flow chart schematically showing a sequence of operations of the CPU 120 which are programmed beforehand into the ROM of the memory 130. FIGS. 3 and 4 are time charts respectively showing the relationship between the reference pulse (A), the computing time (B) of the digital computer 100 and the valve opening time (C) of the fuel injectors 10 at the engine rotational frequency of 1,600 rpm and 3,200 rpm, respectively.

When fuel-air mixture is burned in the engine 1 so that the crankshaft 1*a* is rotated, a reference signal is generated each time the electromagnetic pickup 3 is opposite to the projection 2*a* of the disk 2. The shaper 4 generates the reference pulses shown in (A) of FIGS. 3 and 4 at times $t_1$, $t_2$ and $t_{10}$ through $t_{13}$ synchronized with the reference signals. In (A) of FIGS. 3 and 4, the cycle period of the reference pulses ($t_1$-$t_2$ and $t_{10}$-$t_{11}$) corresponds to $\frac{1}{2}$ of a revolution of the crankshaft 1*a*, so that the reference pulse period is inversely proportional to the number of revolutions of the crankshaft 1*a* and the reference pulse frequency is proportional to the revolutions of the crankshaft 1*a*. When a reference pulse is applied to the digital computer 100 from the shaper 4, the CPU 120 starts to calculate the amount of fuel required by the engine 1.

The CPU 120 starts calculations at a step 101 in response to an interruption as shown in FIG. 2. By the next discrimination step 102, the digital information of the engine rotational speed generated from the input interface 110 is read into the CPU 120 where it is compared with a predetermined value of 3,000 rpm, for example, so as to discriminate whether the engine rotational frequency is higher (YES) than the predetermined value or not (NO).

If the result of the above discrimination is NO, an initial value i is set to zero by a processing step 103. The initial value i=0 indicates that it is required to effect both a calculation according to the program stored in a portion $W_1$ of the ROM in the memory 130 and a calculation according to the program stored in another portion $W_2$. After the step 103, the calculation of a basic quantity $\tau_1$ of fuel quantity $\tau$ is effected. The basic quantity $\tau_1$ is calculated in accordance with the intake air amount and the rotational speed generated from the input interface 110, and the program for this calculation is stored in the portion $W_1$ of the ROM. Next, whether the initial value i is 0 (YES) or not (NO) is discriminated by a discrimination step 105, and in this case the processing proceeds to a processing step 106 since the initial value i has previously been set to i=0 by the step 103. By the processing step 106, an ROM address designation value ADR is set to the portion $W_1$ and the calculation of a correction quantity $\tau_2$ of the fuel quantity $\tau$ is then performed according to the program stored in the portion $W_2$ of the ROM by a step 107. The calculation of the correction quantity $\tau_2$ is effected in accordance with an equation $\tau_2=k\cdot\tau_1$ from the digital value (k) of the cooling water temperature generated from the input interface 110 and the digital value of the basic quantity $\tau_1$, and the result $\tau_1$ of the calculation is temporarily stored. By the next processing step 108, the sum ($\tau=\tau_1+\tau_2$) of the temporarily stored digital values is produced and the resulting sum $\tau$ is delivered from the CPU 120 to the down counter 7 by a processing step 109. Generated simultaneously with the output fuel quantity $\tau$ by this step 109 is a signal for setting the flip-flop 8, and the operation initiated by the previously mentioned interruption is completed by a step 110. The time required for the digital computer 100 to complete the above-mentioned operation is indicated by d in (B) of FIG. 3.

The digital value generated from the digital computer 100 is preset into the down counter 7 so that the down counter 7 immediately starts to count down in response to the clock pulses applied from the oscillator 6 and a borrow signal is generated to reset the flip-flop 8 in response to the reduction of the stored content to zero. Consequently, the flip-flop 8 generates a pulse signal of a time width proportional to the digital value generated from the digital computer 100. As shown in (C) of FIG. 3, the output of the flip-flop 8 is synchronized with the passing of the time d and it is then applied, after amplification by the amplifier 9, to the electromagnetic injector 10 of the specific cylinder as a valve opening signal.

On the other hand, when the rotational frequency of the engine exceeds 3,000 rpm, in response to the reference pulse at the time $t_{10}$ shown in (A) of FIG. 4, the interruption is initiated by the step 101 and the engine rotational frequency is discriminated higher (YES) than 3,000 rpm by the discrimination step 102. When this occurs, the initial value 1 is set to 1 by a processing step 111. The initial value i=1 indicates that the step 104 for calculating the basic quantity $\tau_1$ and the step 107 for calculating the correction quantity $\tau_2$ must be alternately omitted. Firstly, the processing is jumped to the address designation value ADR=$W_1$. Since the program for calculating the basic quantity $\tau_1$ is stored in the portion $W_1$ of the ROM, the CPU 120 calculates the basic quantity $\tau_1$ by the step 104 and the result of the calculation is temporarily stored. Then, whether the initial value i is zero (YES) or not (NO) is discriminated by the step 105, so that since the initial value has been previously set to i=1, the processing certainly proceeds along the course indicated by NO, and the address designation value is set to ADR=$W_2$ by a processing step 112. Consequently, the step 107 is not executed in this calculation cycle. By the step 108 following the step 112, the correction quantity $\tau_2$ calculated by the step 107 in the previous calculation cycle and the basic quantity $\tau_1$ calculated by the step 104 in the present calculation cycle are added, and the digital value indicating the fuel quantity $\tau$ is applied to the down counter 7 by the step 109 after the time $d_1$ shown in (B) of FIG. 4. Thereafter, the down counter 7, the flip-flop 8, the amplifier 9 and the injector 10 operate in the same manner as mentioned previously.

Thereafter, when the following reference pulse shown in (A) of FIG. 4 is applied to the digital computer 100 at the time $t_{11}$, an interruption is effected by the step 101, and the engine speed is discriminated higher (YES) than 3,000 rpm by the step 102. By the step 111, the initial value i is set to 1, and the program stored in the portion $W_2$ of the ROM which was set by the step 112 in the previous calculation cycle is executed. In other words, by the step 106 it is preset to ADR=$W_2$ so that in the next calculation cycle the basic quantity $\tau_1$ is calculated according to the program stored in the portion $W_1$ of the ROM, and by the step 107 the calculation of the correction quantity $\tau_2$ is effected according to the program stored in the portion $W_2$ of the ROM and the result of the calculation is temporarily stored. The correction quantity $\tau_2$ calculated by the step 107 and the basic quantity $\tau_1$ calculated and stored by the step 104 in the previous calculation cycle are added together by the step 108, and the fuel quantity $\tau$ is applied to the down counter 7 after the time $d_2$ shown in (B) of FIG. 4. The down counter 7, the flip-flop 8, the amplifier 9 and the injector 10 operate in the same manner as mentioned previously. When a reference pulse is generated at each of the times $t_{12}$ and $t_{13}$ following the time $t_{11}$, the digital computer 100 operates in the same manner as mentioned previously. In other words, the steps 101, 102, 111, 104, 105, 112, 108, 109 and 110 are sequentially executed in response to the reference pulse generated at the time $t_{12}$, and the steps 101, 102, 111, 106, 107, 108, 109 and 110 are sequentially executed in response to the reference pulse generated at the time $t_{13}$.

It will thus be seen from the operations described above, when the engine rotational speed is higher than 3,000 rpm, similarly as in the case where the rotational speed is lower than 3,000 rpm, each time a reference pulse is generated as shown in (A) of FIG. 4, the pulse signal shown in (C) of FIG. 4 is applied to the injector 10 and the fuel is injected and supplied. It is to be noted here that when the rotational speed is higher than 3,000 rpm, the step 104 for calculating the basic quantity $\tau_1$ and the step 107 for calculating the correction quantity $\tau_2$ are alternately omitted. In other words, the basic quantity $\tau_1$ and the correction quantity $\tau_2$ which determine the fuel quantity $\tau$ are calculated alternately in response to successive reference pulses. To reiterate, for each reference pulse, the most recently calculated values of $\tau_1$ and $\tau_2$ are combined to determine $\tau$. A great part of the time required for the digital computer 100 to execute the steps 101 to 112 is used in calculating the basic quantity $\tau_1$ and the correction quantity $\tau_2$. As a result, the time interval from the time that a reference pulse is generated until the time that the injection of fuel is started, i.e., the time $d_1$ and $d_2$ shown in (B) of FIG. 4 and required for the digital computer 100 to calculate the fuel quantity $\tau$ when the rotational speed is higher than 3,000 rpm, is less than the time d shown in (B) of FIG. 3 and required for the digital computer 100 to calculate the fuel quantity $\tau$ when the rotational speed is lower than 3,000 rpm. Consequently, at higher engine rotational speeds, the supply of fuel effected in response to each reference pulse generated can be completed within one cycle period of the reference pulses.

Figure 5:
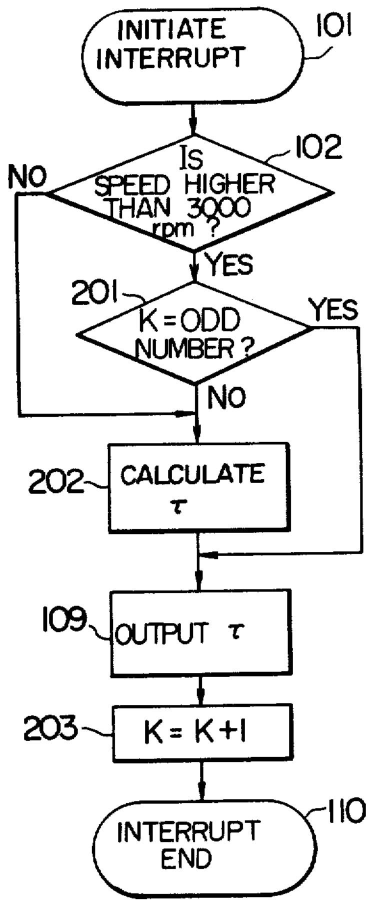
FIG. 5 is a flow chart showing another exemplary processing steps performed by the digital computer shown in FIG. 1.

FIG. 5 shows another embodiment of the invention which is different from the embodiment shown in FIG. 2, particularly the principal steps which are to be executed by the CPU 120 of the computer 100. Similarly as the previously described embodiment, the steps shown in FIG. 5 represent a program which is established and stored beforehand in the ROM of the memory 130 in the digital computer 100.

Figure 6:
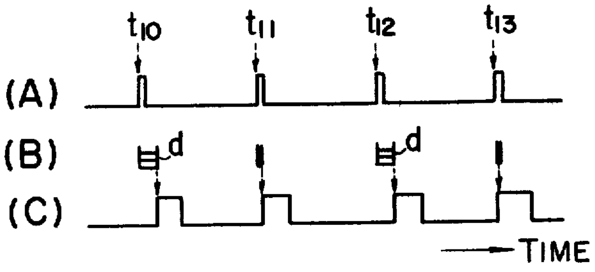
FIG. 6 is a time chart useful for explaining the operation of the apparatus of FIG. 1 performing the processing steps shown in FIG. 5.

Firstly, when the engine rotational speed is lower than 3,000 rpm, every time the reference pulse shown in (A) of FIG. 3 is generated, an interruption is started in the CPU 120 by a step 101, and the rotational speed is discriminated lower (N0) than 3,000 rpm by a step 102. The fuel quantity $\tau$ is calculated by the next processing step 202, and the result of the calculation is stored in RAM. This calculation result is introduced into the down counter 7 by a step 109. Then, by a step 203, 1 is added to an initial value K, and the interruption processing is completed by a step 110. The initial value K is one which is set to zero upon connection of the apparatus to the power source and which is increased every time a reference pulse is generated from the shaper 4. Consequently, when the rotational speed is lower than 3,000 rpm, every time a reference pulse is generated as shown in (A) of FIG. 3 which was mentioned previously, the fuel quantity $\tau$ is calculated by the digital computer 100 and the fuel is supplied by the injector 10. If the program is established so that the step 202 comprises the steps 104, 107 and 108 shown in FIG. 2, the time required for the digital computer 100 to compute the fuel quantity $\tau$ will become substantially equal to the time d in the previously described embodiment, On the other hand, when the rotational speed is higher than 3,000 rpm, in response to the reference pulses generated at times $t_{10}$ through $t_{13}$ shown in (A) of FIG. 6, the CPU 120 executes the step 101 and the rotational speed is discriminated higher (YES) by the step 102. Thereafter, whether the initial value K is an odd number (YES) or not (NO) is discriminated by the step 201. When the initial value K is not an odd number (NO), that is, when a reference pulse is generated at the times $t_{10}$ and $t_{12}$, respectively, the fuel quantity $\tau$ is calculated by the step 202, and the result of the calculation is stored in the RAM. Thereafter, this calculation result is applied to the down counter 7 by the step 109. On the other hand, when the initial value K is an odd number (YES), e.g., when a reference pulse is generated at the times $t_{11}$ and $t_{13}$, respectively, the calculation of the fuel quantity $\tau$ by the step 202 is not performed, and the calculation result stored in the RAM in the previous calculation cycle is applied as a calculated value to the down counter 7 by the step 109. Thus, with the rotational speed being higher than 3,000 rpm, when two reference pulse signals are generated, as shown in (B) of FIG. 6, the fuel quantity $\tau$ is calculated in response to only the first of the two reference pulses so that in accordance with the result of this calculation, fuel is injected twice from the injectors 10 as shown in (C) of FIG. 6. Thus, when the rotational speed is higher than 3,000 rpm, as shown in (B) of FIG. 6, the digital computer 100 requires in one case a time d for producing the fuel quantity $\tau$ and it require practically no such time in another case, thus varying angular position that fuel is supplied, with respect to the engine cycle. However, such a slight variation in the angular position that fuel is supplied is permissible.

In the two embodiments described above, it is possible to arrange so that the engine rotational speed is discriminated at a plurality of threshold points, and the engine rotational speeds are divided into three different regions, thus decreasing the number of calculations by the digital computer 100 each time the engine rotational speed reaches the higher speed region. Also, the present invention is not intended to be limited to the methods and apparatus for supplying fuel to internal combustion engines, and the present invention may be applied to a method and apparatus for controlling the ignition timing of internal combustion engines.

What is claimed is:

1. A method for controlling a combustion engine having an output shaft rotated by the combustion of fuel comprising the steps of:

generating reference pulses, one of said reference pulses being generated each time said output shaft of said combustion engine is rotated to a predetermined rotational reference position;

detecting operating parameters of said combustion engine, said operating parameters including the rotational speed of said output shaft;

comparing a detected value of the rotational speed of said output shaft with a predetermined value to discriminate whether the rotational speed of said output shaft is high or low;

calculating a total value related to the required amount of fuel from said detected parameters with a preliminarily established calculating program having first and second portions for determining first and second values, respectively, the combination of said first and second values being related to said total value, both of said portions being executed and said first and second values being determined in response to each of said reference pulses during the period the rotational speed of said output shaft is discriminated as being low, and said first portion and said second portion being executed alternately, and said first and second values being determined alternately, in response to successive ones of said reference pulses during the period the rotational speed of said output shaft is discriminated as being high, said total value being determined after each of said reference pulses from the most recently calculated first and second values;

converting said total value corresponding to said required amount of fuel into a time period each time said reference pulse is generated; and supplying fuel to said combustion engine during said time period.

2. A method for controlling a combustion engine having an output shaft rotated by the combustion of fuel comprising the steps of:

generating reference pulses, one of said reference pulses being generated each time said output shaft of said combustion engine is rotated to a predetermined rotational reference position;

detecting operating parameters of said combustion engine, said operating parameters including the rotational speed of said output shaft;

comparing a detected value of the rotational speed of said output shaft with a predetermined value to discriminate whether the rotational speed of said output shaft is high or low;

calculating a total value related to the required amount of fuel from said detected parameters with a preliminarily established calculating program having first and second portions for determining first and second values, respectively, the combination of said first and second values being related to said total value, both of said portions being executed and said first and second values being determined in response to each of said reference pulses during the period the rotational speed of said output shaft is discriminated as being low, and said first portion and said second portion being executed alternately, and said first and second values being determined alternately, in response to successive ones of said reference pulses during the period the rotational speed of said output shaft is discriminated as being high, said total value being determined after each of said reference pulses from the most recently calculated first and second values;

generating a control pulse whose time width is proportional to said calculated value each time said reference pulse is generated; and controlling the fuel combustion of said combustion engine by using said control pulse.

3. Apparatus for controlling a combustion engine having an output shaft rotated by the combustion of fuel comprising:

a pulse generator communicating with said output shaft for generating reference pulses, one of said reference pulses being generated each time said output shaft of said combustion engine is rotated to a predetermined rotational reference position;

means for detecting operating parameters of said combustion engine, including means for generating a signal related to the rotational speed of said output shaft;

means, responsive to said detecting and pulse generator means for comparing the rotational speed of said output shaft with a predetermined speed value to discriminate whether the rotational speed of said output shaft is high or low, and for calculating a total value related to the required amount of fuel from the output of said detecting means with a preliminarily established calculating program having first and second portions for determining first and second values, respectively, the combination of said first and second values being related to said total value, both of said portions being executed and said first and second values being determined in response to each of said reference pulses during the period the rotational speed of said output shaft is discriminated as being low, and said first portion and said second portion being executed alternately, and said first and second values being determined alternately, in response to successive ones of said reference pulses during the period the rotational speed of said output shaft is discriminated as being high, said total value being determined after each of said reference pulses from the most recently calculated first and second values;

means for converting said total value corresponding to said required amount of fuel into a time period each time said reference pulse is generated; and means for supplying fuel to said combustion engine during said time period.

4. In a method for controlling a combustion engine having an output shaft rotated by the combustion of fuel, said method including the steps of generating reference pulses, one of said reference pulses being generated each time said output shaft of said combustion engine is rotated to a predetermined rotational reference position, detecting operating parameters of said combustion engine, said operating parameters including the rotational speed of said output shaft, calculating a total value related to the required amount of fuel from said detected parameters with a preliminarily established calculating program, converting said total value corresponding to said required amount of fuel into a time period each time said reference pulse is generated, and supplying fuel to said combustion engine during said time period, the improvement wherein:

said method further comprises the step of comparing detected values of the rotational speed of said output shaft with a predetermined value to discriminate whether the rotational speed of said output shaft is high or low;

said preliminarily established calculating program has first and second portions for determining first and second values, respectively, the combination of said first and second values being related to said total value; and said calculating step further comprises the steps of executing both of said portions and determining said first and second values in response to each of said reference pulses during the period the rotational speed of said output shaft is discriminated as being low, and executing said first portion and said second portion alternately, and determining said first and second values alternately, in response to successive ones of said reference pulses during the period the rotational speed of said output shaft is discriminated as being high, said total value being determined after each of said reference pulses from the most recently calculated first and second values.

* * * * *